United States Patent
Kok et al.

(10) Patent No.: US 10,210,412 B2
(45) Date of Patent: Feb. 19, 2019

(54) OPTICAL ENCODER CAPABLE OF IDENTIFYING ABSOLUTE POSITIONS AND OPERATING METHOD THEREOF

(71) Applicant: PIXART IMAGING INC., Hsin-Chu County (TW)

(72) Inventors: Boon-How Kok, Penang (MY); Keen-Hun Leong, Penang (MY); Ching-Geak Chan, Penang (MY); Chiang-Hee Lim, Penang (MY); Chu-Leik Ho, Penang (MY); Hsin-Chia Chen, Hsin-Chu County (TW); Yen-Min Chang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 118 days.

(21) Appl. No.: 15/347,309

(22) Filed: Nov. 9, 2016

(65) Prior Publication Data
US 2017/0061226 A1    Mar. 2, 2017

Related U.S. Application Data

(63) Continuation-in-part of application No. 14/573,023, filed on Dec. 17, 2014, now Pat. No. 9,753,550, and (Continued)

(30) Foreign Application Priority Data

| | | |
|---|---|---|
| Mar. 13, 2014 | (TW) | 103109350 A |
| May 28, 2014 | (TW) | 103118735 A |
| Apr. 17, 2015 | (TW) | 104112384 A |

(51) Int. Cl.
*G01D 5/34* (2006.01)
*G06K 9/20* (2006.01)
(Continued)

(52) U.S. Cl.
CPC ......... *G06K 9/2036* (2013.01); *G06F 3/0312* (2013.01); *G06K 9/00986* (2013.01);
(Continued)

(58) Field of Classification Search
CPC .. G06K 9/2036; G06K 9/2027; G06K 9/4661; G06K 9/00986; G01D 5/34; H04N 19/00; H04N 5/2256; G06F 3/0312
(Continued)

(56) References Cited

U.S. PATENT DOCUMENTS

| | | |
|---|---|---|
| 4,338,518 A | 7/1982 | Brienza et al. |
| 4,642,634 A | 2/1987 | Gerri et al. |

(Continued)

FOREIGN PATENT DOCUMENTS

| | | |
|---|---|---|
| TW | 201346610 A | 11/2013 |
| TW | 201407448 A | 2/2014 |
| TW | 201500973 A | 1/2015 |

*Primary Examiner* — Seung C Sohn
(74) *Attorney, Agent, or Firm* — Hauptman Ham, LLP

(57) ABSTRACT

The present disclosure is related to an optical encoder which is configured to provide precise coding reference data by feature recognition technology. To apply the present disclosure, it is not necessary to provide particular dense patterns on a working surface. The precise coding reference data can be generated by detecting surface features of the working surface.

20 Claims, 15 Drawing Sheets

Related U.S. Application Data a continuation of application No. 15/087,507, filed on Mar. 31, 2016, now Pat. No. 10,061,404.

(51) Int. Cl.
    *G06K 9/46*     (2006.01)
    *G06K 9/00*     (2006.01)
    *G06F 3/03*     (2006.01)
    *H04N 19/00*     (2014.01)
    *H04N 5/225*     (2006.01)

(52) U.S. Cl.
    CPC ......... *G06K 9/2027* (2013.01); *G06K 9/4661* (2013.01); *H04N 19/00* (2013.01); *H04N 5/2256* (2013.01)

(58) Field of Classification Search
    USPC .......................................... 250/231.1–231.18
    See application file for complete search history.

(56) References Cited

U.S. PATENT DOCUMENTS

| | | | |
|---|---|---|---|
| 6,246,050 | B1 | 6/2001 | Tullis et al. |
| 7,378,643 | B2 * | 5/2008 | Lum .................. G01D 5/34715 250/221 |
| 8,345,003 | B1 * | 1/2013 | Trisnadi ................ G06F 3/0354 345/157 |
| 8,598,509 | B2 | 12/2013 | Batchelder |
| 8,988,391 | B2 | 3/2015 | Reigneau |
| 2004/0012794 | A1 | 1/2004 | Nahum et al. |
| 2007/0051884 | A1 | 3/2007 | Romanov et al. |
| 2009/0108175 | A1 | 4/2009 | Grot |
| 2011/0220781 | A1 | 9/2011 | Batchelder |
| 2012/0224188 | A1 | 9/2012 | Lim et al. |
| 2013/0038535 | A1 | 2/2013 | Chen et al. |
| 2015/0097778 | A1 | 4/2015 | Chang |

* cited by examiner

OPTICAL ENCODER CAPABLE OF IDENTIFYING ABSOLUTE POSITIONS AND OPERATING METHOD THEREOF

RELATED APPLICATIONS

The present application is a continuation-in-part application of U.S. patent application Ser. No. 14/573,023 filed on Dec. 17, 2014, which claims priority to Taiwanese Application Number 103109350, filed Mar. 13, 2014 and Taiwanese Application Number 103118735, filed May 28, 2014, and is a continuation-in-part application of U.S. patent application Ser. No. 15/087,507 filed on Mar. 31, 2016, which claims priority to Taiwanese Application Number 104112384, filed Apr. 17, 2015, the disclosures of which are hereby incorporated by reference herein in their entirety.

BACKGROUND

1. Field of the Disclosure

This disclosure is related to an optical encoder capable of identifying absolute positions and an operating method thereof that identify the absolute positions according to the surface feature or the shutter parameter.

2. Description of the Related Art

Conventionally, means for optical encoding generally needs to process a working surface to have markers with a specific density for reflecting light or light penetration. Or the encoding is implemented by arranging light sources in a particular way or controlling the light emitting sequence. For example, U.S. Pat. No. 8,598,509 discloses a plurality of light sources for emitting light in a particular sequence as well as an encoded working surface with predetermined gaps such that the light can penetrate the gaps in a predetermined manner to be detected by a photodetector. The detection result is used to generate the coding reference data, e.g. position data or velocity data of some elements in the system.

However, in this conventional technology a special processing has to be performed on the working surface previously such that the application thereof is limited. Meanwhile, in order to obtain an accurate detection result, the processing of the working surface becomes complicated so that the difficulty of applying this technology also becomes higher.

SUMMARY

The present disclosure provides an optical encoder including a light emitting unit, a light sensing unit, a memory unit and a processing unit. The light emitting unit is configured to emit light to a detection surface to be recognized, and the light sensing unit is configured to detect reflected light from the surface to generate detected signals. The processing unit is configured to generate the frame processing result according to the detected signals, which are stored in the memory unit, to be served as a basis of the following encoding process. The frame processing includes one or a combination of the digital filtering, image enhancement, edge extraction, digitization or binarization, but not limited thereto. The optical encoder may have relative motion with respect to the surface, and the light sensing unit, in cooperation with the light emitting unit, may generate the detected signals at a high frame rate. When the frame rate is higher, a higher relative speed is detectable.

The present disclosure further provides an optical encoder including a light emitting unit, a light sensing unit and a processing unit. The light emitting unit is configured to emit light to a detection surface. The light sensing unit is configured to detect reflected light from the detection surface using a shutter parameter to generate detected signals. The processing unit is configured to store, in a registration mode, at least one predetermined shutter parameter range corresponding to at least one reference position on the detection surface according to the shutter parameter, and determine, in a comparison mode, a current position by comparing a current shutter parameter with the predetermined shutter parameter range.

The present disclosure further provides an optical encoder including a light emitting unit, a light sensing unit and a processing unit. The light emitting unit is configured to emit light to a detection surface. The light sensing unit is configured to detect reflected light from the detection surface to generate detected signals. The processing unit is configured to store, in a registration mode, at least one predetermined image feature range corresponding to at least one reference position on the detection surface according to the detected signals, and determine, in a comparison mode, a current position by comparing a current image feature with the predetermined image feature range.

The present disclosure further provides an operating method of an optical encoder including the steps of: storing, in a registration mode, at least one predetermined shutter parameter range corresponding to at least one reference position on a detection surface according to a shutter parameter of a light sensing unit for detecting light reflected from the detection surface; and comparing, in a comparison mode, a current shutter parameter with the predetermined shutter parameter range to determine a current position.

In one aspect, the processing unit is configured to identify the original position and the at least one reference position of the operation range according to a moving vector, a moving distance, a rotation angle or a rotation time.

In one aspect, the processing unit is configured to calculate a position difference between the comparison image data and the reference data to accordingly correct an accumulated error.

In one aspect, the processing unit is configured to identify positions at which a difference value between the comparison image data and the reference data exceeds an identification threshold as unidentified positions.

To achieve the above objects, at least one frame of image having features is recorded in the memory unit to be served as a reference basis in the following encoding process. Especially in the position correction function, an original position can be precisely set or a user may arbitrarily set the reference position according to the requirement. The image having features may be generated by forming markers on the detection surface for being detected by a sensing unit or by detecting surface features using the sensing unit.

The optical encoder of the present disclosure stores at least one frame of image having features or a processed image for indicating a specific position. Accordingly, when the optical encoder captures the image again, a position difference between the two images is reported by using the algorithm for being used by a system adopting the optical encoder. The system then fine tunes the position of the hardware so as to maintain a high accuracy.

When a detection surface has marks for being detected by a sensing unit, features of the markers, e.g. the size and the feature position, have to be arranged in cooperation with the size and the resolution of the sensing unit of the optical encoder as well as the disposed position of the optical encoder. Briefly speaking, the size of the sensing unit has to cover at least the frame formed by the light reflected from the features of the markers, and the resolution of the sensing unit has to be able to identify the features in the frame.

Compared to the conventional optical encoder, the optical navigation chip, the optical navigation module and the optical encoder provided by the present disclosure do not need any optical lens disposed on the light-emitting unit and the sensing array, and the optical navigation chip, the optical navigation module and the optical encoder can calculate the relative displacement between the optical navigation chip and the displacement generating unit of the optical encoder based on the images captured by the sensing array. Because the optical navigation chip, the optical navigation module and the optical encoder do not need the optical lens, the sizes of the optical navigation chip, the optical navigation module and the optical encoder can be reduced for microminiaturization.

DETAILED DESCRIPTION OF THE EMBODIMENT

Figure 1:
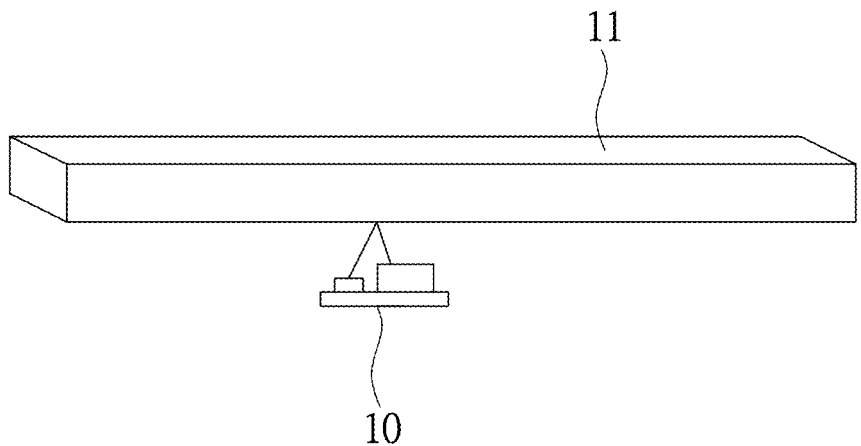
FIG. 1 is a schematic diagram illustrating an optical encoder according to an embodiment of the present disclosure.

The descriptions below include some embodiments of the present disclosure and schematic diagrams of user's operation for understanding how the present disclosure is applied to actual operating conditions. It should be noted that in the drawings below elements not related to the technology of the present disclosure are omitted. Meanwhile, in order to clearly show the relationship between elements, the scale of elements in the drawings may not be identical to its actual scale.

Notably, the terms first, second, third, etc., may be used herein to describe various elements, but these elements should not be affected by such terms. Such terminology is used to distinguish one element from another. Further, the term "or" as used herein may include any one or combinations of the associated listed items.

Please refer to FIG. 1, which is a schematic diagram illustrating an optical encoder according to an embodiment of the present disclosure. The optical encoder 1 includes an optical navigation module 10 and a displacement generating unit 11. The optical navigation module 10 is disposed corresponding to a surface of the displacement generating unit 11.

The optical navigation module 10 is configured for operatively providing a light beam and irradiating the surface of the displacement generating unit 11, and then receiving a reflected light beam which the surface of the displacement generating unit 11 reflects. Once every capturing interval, the optical navigation module 10 captures an image belonging to a part of the surface of the displacement generating unit 11 based upon the reflected light beam.

The displacement generating unit 11, such as a ring, a slide rail or a round tube, can be moved to generate a displacement. In certain applications, the displacement generating unit 11 can not be moved, and the optical navigation module 10 can be moved, such that a relative position between the optical navigation module 10 and the displacement generating unit 11 changes. A shape of the displacement generating unit 11 can change to support different applications.

For example, when the optical navigation module 10 is used in an optical mouse, the displacement generating unit 11 is a desktop. A user can operate the optical mouse to generate the displacement, and the optical navigation module 10 calculates how much displacement as the optical mouse moves on the desktop. Or, the optical navigation module 10 can be used in a syringe, and the displacement generating unit 11 is a plunger rod. When the plunger rod is pulled or pushed, the optical navigation module 10 can sense the displacement of the plunger rod.

In brief, when the relative position between the optical navigation module 10 and the displacement generating unit 11 changes, the optical navigation module 10 can determine the displacement of the optical navigation module 10 according to the images associated with the surface of the displacement generating unit 11, and calculate a relative displacement between the optical navigation module 10 and the displacement generating unit 11.

In the embodiment, the surface of the displacement generating unit 11 does not comprise any specific special pattern. In the event that it comprises a special pattern, the special pattern could be such as a recognition block, and a light reflection rate of the recognition block is different from a light reflection rate of the surface or the special pattern could be such as an etching pattern, and the etching pattern would be below the surface and form a notch. It should be noted that the aforesaid special patterns are just taken as an example, but the present disclosure is not limited thereto.

Figure 2:
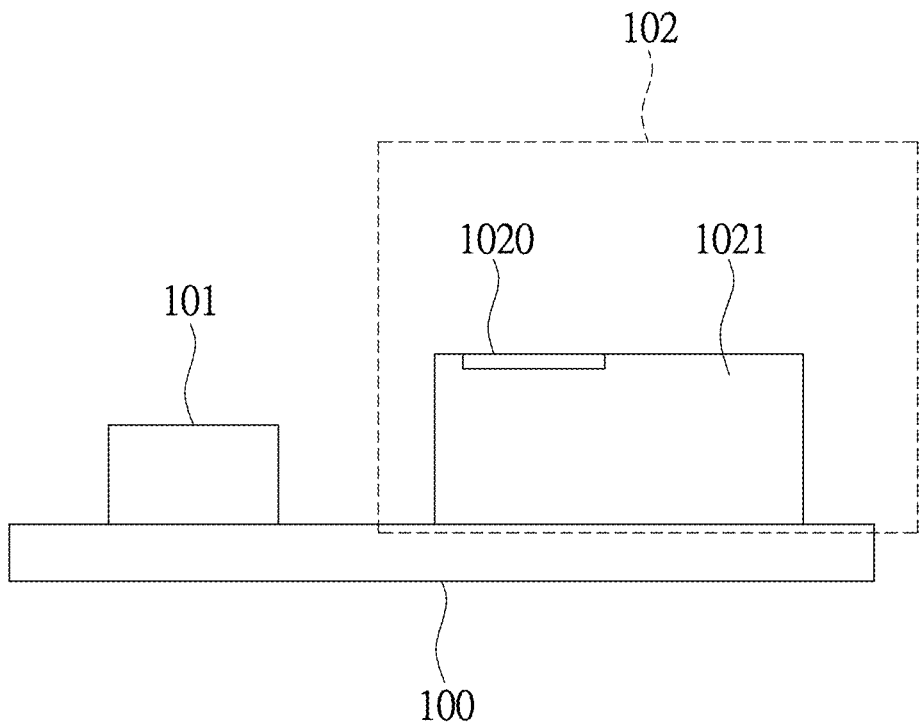
FIG. 2 is a schematic diagram illustrating an optical navigation module according to an embodiment of the present disclosure.

Please refer to FIG. 2, which is a schematic diagram illustrating an optical navigation module according to an embodiment of the present disclosure. The optical navigation module 10 includes a substrate 100, a light-emitting unit 101 and an optical navigation chip 102. The light-emitting unit 101 and the optical navigation chip 102 are disposed on the substrate 100. The substrate 100 is such as a printed circuit board (PCB). The light-emitting unit 101 is proximate to the optical navigation chip 102. A spacing distance between the light-emitting unit 101 and the optical navigation chip 102 can be changed based on practical demands, as long as the optical navigation chip 102 can receive the reflected light beam provided by the surface of the displacement generating unit (as the displacement generating unit 11 shown in FIG. 1).

The light-emitting unit 101, such as a laser diode or a light emitting diode, is configured for operatively providing the light beam to irradiate the surface of the displacement generating unit 11. The light beam provided by the light-emitting unit 101 has a low divergence angle. Thus, the light-emitting unit 101 does not need an optical lens to focus or expand the light beam for reducing scattering.

When the light-emitting unit 101 is the laser diode, the light-emitting unit 101 provides a laser light beam. The laser light beam with low divergence angle is hard to scatter. Hence, the laser diode can be used in the optical navigation module 10 directly. To put it concretely, the low divergence angle means that a horizontal divergence angle and a vertical divergence angle of the light beam are respectively less than 10 degrees and 35 degrees. When the light-emitting unit 101 is the light emitting diode, the light emitting diode is specially designed for providing the light beam with low divergence angle.

In brief, the light-emitting unit 101 can be a laser diode, a light emitting diode or other element which can provide a light beam with low divergence angle. Thus, the light-emitting port of the light-emitting unit 101 does not have to dispose an optical lens for focusing the light beam. Incidentally, the values of the low divergence angle mentioned above are just taken as an example, but the present disclosure is not limited thereto. Those skilled in the art can appropriately adjust the divergence angle of the light beam based on the divergence angle of the laser light beam to accomplish the optical navigation module 10 mentioned above.

The optical navigation chip includes a sensing array 1020 and a displacement calculating unit 1021. The sensing array 1020 is coupled to the displacement calculating unit 1021. The sensing array 1020, such as a Complementary Metal-Oxide Semiconductor (CMOS) image sensing array, or a Charge-coupled Device (CCD) image sensing array, is composed by a plurality of pixels forming a pixel matrix. Due to the optical navigation module 10 being disposed corresponding to the surface of the displacement generating unit 11, the sensing array 1020 receives the reflected light beam reflected by the surface and captures an image belonging to a part of the surface once every capturing interval based upon the reflected light beam.

As described previously, the light beam provided by the light-emitting unit 101 has a low divergence angle, such that the light beam is completely provided to the surface of the displacement generating unit 11. On the other hand, the surface of the displacement generating unit 11 completely reflects the light beam to the sensing array 1020. Thus, the sensing array 1020 can capture a clear image without setting up an optical lens to focus the reflected light beam.

Incidentally, light-cohesion of the laser light beam is higher than light-cohesion of the light beam provided by the light emitting diode. In the embodiment, the sensing array 1021 can obtain a clearer image when the optical navigation module 10 uses the laser diode as a light source.

The displacement calculating unit 1021 having an image processing function is configured for operatively receiving the image outputted by the sensing array 1020, and processes the images. Next, the displacement calculating unit 1021 calculates a relative displacement between the optical navigation chip 102 and the surface of the displacement generating unit 11 according to the images. The technique related to calculating the relative displacement is well known to those of ordinary skill in the art, thus it does not bear repeating herein.

After obtaining the relative displacement between the optical navigation chip 102 and the displacement generating unit 11, the displacement calculating unit 1021 outputs the calculated result to back-end circuits. Then the back-end circuits implement a corresponding function, such as moving a cursor of the mouse.

Figure 3:
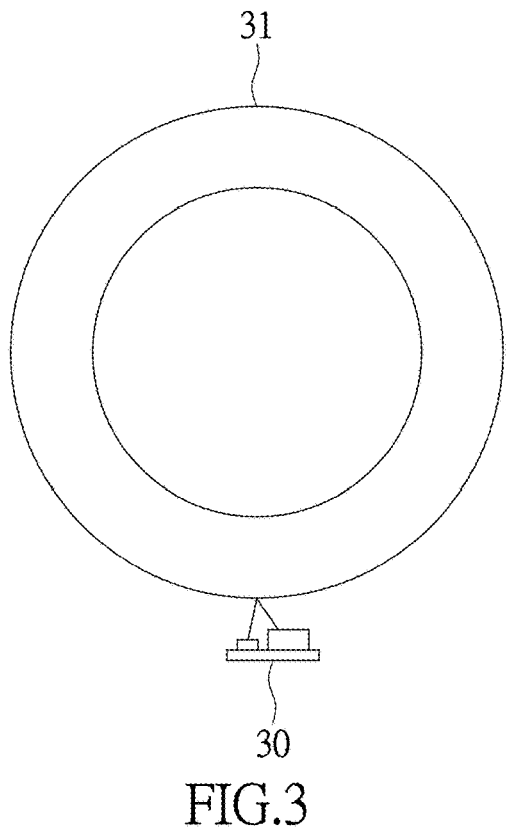
FIG. 3 is a schematic diagram illustrating an optical encoder according to another embodiment of the present disclosure.

Please refer to FIG. 3, which is a schematic diagram illustrating an optical encoder according to another embodiment of the present disclosure. The optical encoder 3 also includes an optical navigation module 30 and a displacement generating unit 31. Structures and functions of the optical navigation module 30 are similar to the optical navigation module 10 shown in FIG. 1, thus their descriptions are omitted, and therefore only differences between them will be described below.

Different from the optical navigation module 10 shown in FIG. 1, the displacement generating unit 31 of the optical encoder 3 is a ring. The optical navigation module 30 is disposed corresponding to an external surface of the displacement generating unit 31.

For example, the optical encoder 3 is used in a stereo system as a volume control knob. A user can adjust volume of the stereo system by turning the optical encoder 3. The optical navigation module 30 senses the external surface of the displacement generating unit 31 to calculate a relative displacement between an optical navigation chip of the optical navigation module 30 and the external surface of the displacement generating unit 31. Next, the optical navigation module 30 outputs the calculated relative displacement to a back-end circuit, such as a host, and then the back-end circuit correspondingly adjusts the volume of the stereo system.

Such as the embodiment mentioned above, the external surface of the displacement generating unit 31 can be a smooth surface without any special pattern or there can be at least one special pattern disposed on the external surface of the displacement generating unit 31 and the optical navigation module 30 can calculate the relative displacement between the optical navigation module 30 and the displacement generating unit 31 by using the special pattern.

Notably, in the embodiment, the external surface of the displacement generating unit 31 can further include a starting pattern. When the sensing array of the optical navigation module 30 detects the starting pattern, the displacement calculating unit of the optical navigation module 30 determines the displacement generating unit 31 has rotated one cycle and returned to a start point (such as the starting pattern).

Figure 4:
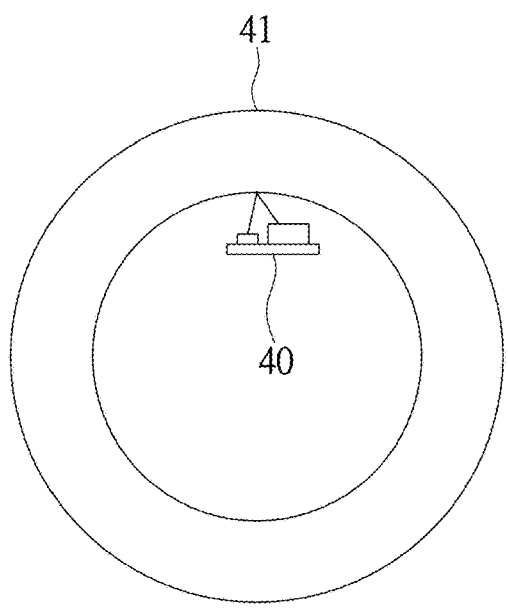
FIG. 4 is a schematic diagram illustrating an optical encoder according to another embodiment of the present disclosure.

Please refer to FIG. 4, which is a schematic diagram illustrating an optical encoder according to another embodiment of the present disclosure. The optical encoder 4 also includes an optical navigation module 40 and a displacement generating unit 41. Structures and functions of the optical navigation module 40 are similar to the optical navigation module 10 shown in FIG. 1 and the optical navigation module 30 shown in FIG. 3, thus their descriptions are omitted, and therefore only differences between them will be described below.

The displacement generating unit 41 of the optical encoder 4 is also a ring. Different from the optical encoder 3 shown in FIG. 3, the optical navigation module 40 is disposed corresponding to an inner surface of the displacement generating unit 41. A flow chart for the optical navigation module 40 calculating a relative displacement would be similar to that for the optical navigation module 30, and further descriptions are therefore omitted.

Figure 5:
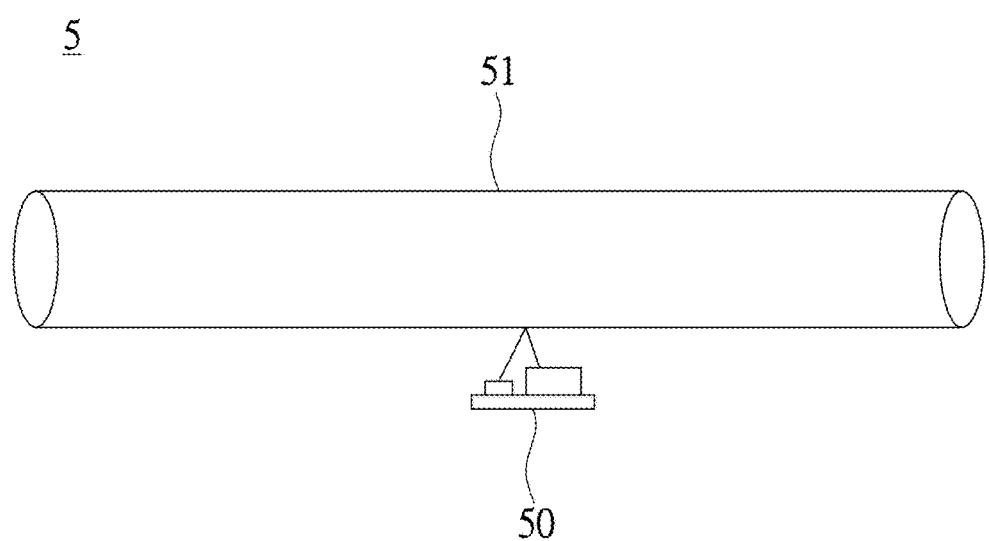
FIG. 5 is a schematic diagram illustrating an optical encoder according to another embodiment of the present disclosure.

Please refer to FIG. 5, which is a schematic diagram illustrating an optical encoder according to another embodiment of the present disclosure. The optical encoder 5 also includes an optical navigation module 50 and a displacement generating unit 51. Structures and functions of the optical navigation module 50 are similar to the optical navigation module 10 shown in FIG. 1, the optical navigation module 30 shown in FIG. 3 and the optical navigation module 40 shown in FIG. 4, thus their descriptions are omitted, and therefore only differences between them will be described below.

Different from the optical encoders 1, 3 and 4, the displacement generating unit 51 of the optical encoder 5 is a round tube. The optical navigation module 50 is disposed corresponding to an external surface of the displacement generating unit 51.

For example, the optical encoder 5 is a knob disposed at one side of a smart watch. A user can turn the knob to adjust time or date of the smart watch. When the knob is turned to generate a displacement, the optical navigation module 50 detects the external surface of the knob to calculate a relative displacement between an optical navigation chip of the optical navigation module 50 and the external surface of the knob. Next, the optical navigation module 50 outputs the calculated relative displacement to a back-end circuit (such as a processor of the smart watch), such that the back-end circuit correspondingly adjusts the time or the date of the smart watch.

Such as the embodiment mentioned above, the external surface of the displacement generating unit 51 can be a smooth surface without any special pattern or there can be at least one special pattern disposed on the external surface of the displacement generating unit 51. The external surface of the displacement generating unit 51 can further include a starting pattern. When the sensing array of the optical navigation module 50 detects the starting pattern, the displacement calculating unit of the optical navigation module 50 determines the displacement generating unit 51 has rotated one cycle.

In summary, compared to the conventional optical encoder, the optical navigation chip, the optical navigation module and the optical encoder provided by the present disclosure do not need any optical lens disposed on the light-emitting unit and the sensing array, and the optical navigation chip, the optical navigation module and the optical encoder can calculate the relative displacement between the optical navigation chip and the displacement generating unit of the optical encoder based on the images captured by the sensing array. Because the optical navigation chip, the optical navigation module and the optical encoder do not need the optical lens, the sizes of the optical navigation chip, the optical navigation module and the optical encoder can be reduced for microminiaturization.

Furthermore, the present disclosure uses the laser diode as the light resource. Due to the laser light beam provided by the laser diode having high cohesion, high directionality and high light-intensity, the optical navigation chip can capture the images with high image clarity. Hence, the optical navigation chip can precisely calculate the relative displacement based on the images with high image clarity.

Figure 6:
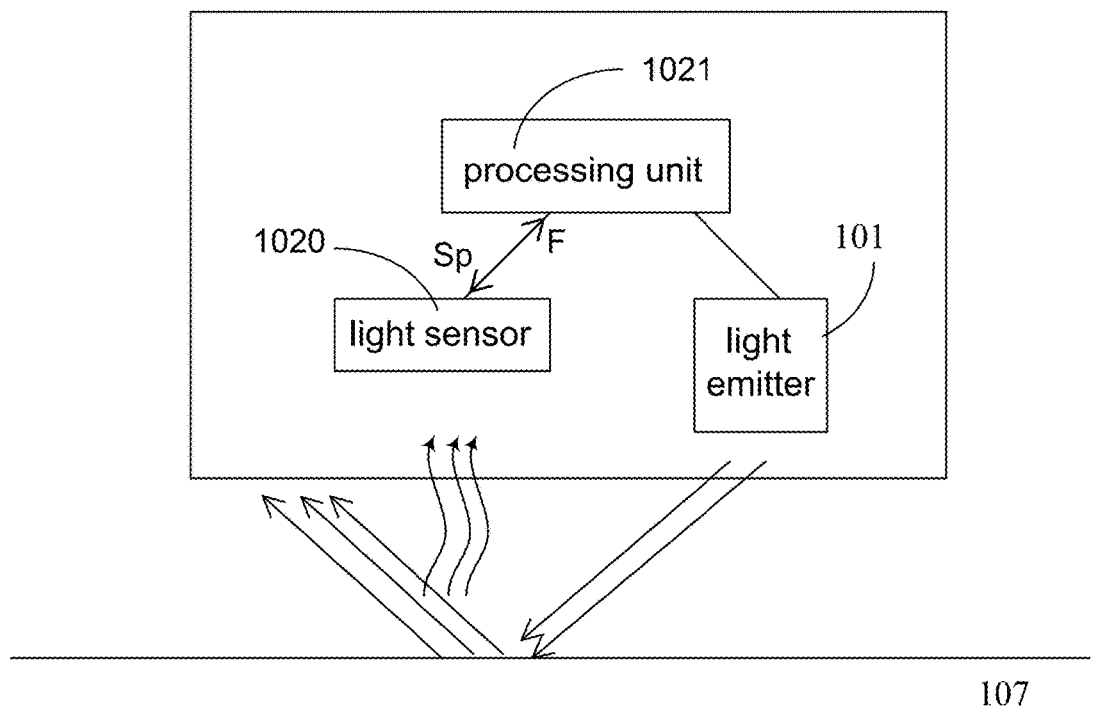
FIG. 6 is one embodiment of the present disclosure.

FIG. 6 is one embodiment of the present disclosure. An optical encoder 10 of this embodiment is operated similar to the optical navigation module 10 of FIGS. 1-2, and thus the same reference number is used herein. The optical encoder 10 includes a light emitting unit 101, a light sensing unit 1020 and a processing unit 1021, wherein the processing unit 1021 is a digital signal processor (DSP) which operates using algorithms implemented by software and/or hardware. The light sensing unit and processing unit are respectively operated similar to the sensing array 1020 and displacement calculating unit 1021 in FIG. 2, and thus the same reference numbers are used herein. The light emitting unit 101 is configured to emit light to a detection surface 107, and the light sensing unit 1020 is configured to detect reflected light from the detection surface 107 using a shutter parameter to generate detected signals, wherein the shutter parameter includes at least one of a shutter speed and a diaphragm. For example, when the detection surface 107 is a dark surface, the shutter parameter is relatively high; whereas, when the detection surface 107 is a bright surface, the shutter parameter is relatively low. The processing unit 1021 is configured to decide the shutter parameter Sp and process the detected signals to generate frame identification results, and the frame processing results are stored, for example, in a memory integrated in the processing unit 1021 or stored in the hardware outside of the optical encoder through a transmission interface for being accessed in the following controlling and comparison processes.

The frame processing results include image features such as an image quality value or a pixel statistic value, wherein the image quality herein is referred to contrast, roughness, smoothness, directionality or feature counting such as peaks counting, edges counting, gray value differences counting or the like.

Figure 6A:
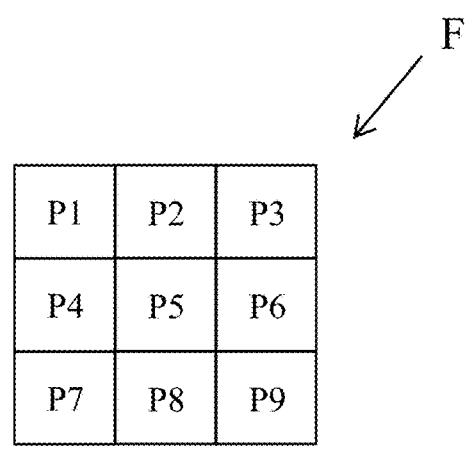
FIG. 6a is a schematic diagram of an image captured by the light sensing unit of FIG. 6.

Referring to FIG. 6a, it is a schematic diagram of an image F, which includes 9 pixels P1 to P9, captured by the light sensing unit 1020. However, the pixel number is only intended to illustrate but not to limit the present disclosure. In one embodiment, the processing unit 1021 calculates a gray value difference between adjacent pixels in the image F. For example, the processing unit 1021 compares gray value differences between each pixel and all pixels adjacent thereto with a difference threshold, and when one gray value difference exceeds (larger than or equal to) the difference threshold, a count value is added by 1 whereas when one gray value difference is smaller than the difference threshold, the count value is added by 0 or maintained unchanged. For example, the processing unit 1021 calculates the gray value difference respectively between pixels P2, P4, P5 and the pixel P1 and compares these gray value differences with the difference threshold, calculates the gray value difference respectively between pixels P1, P3 to P6 and the pixel P2 and compares these gray value differences with the difference threshold and so on. Accordingly, the processing unit 1021 may obtain a count value, as a feature counting, associated with every pixel P1 to P9, and these count values are stored as a digital value. In another embodiment, the processing unit 1021 calculates a gray value difference between two groups of pixels, e.g. a gray value sum of pixels P1 and P9, a gray value sum of pixels P3 and P7, and when a difference of sum between these two gray value sums exceeds a difference threshold, a digital value "0" used as a feature counting may be designated and stored whereas when the difference of sum is smaller than the difference threshold, a digital value "1" used as a feature counting may be designated and stored. In other embodiments, an average gray value of gray values of each pixel and all pixels adjacent thereto may be stored as a pixel statistic value by digital values. The above stored data is configured as reference data for being accessed in the following controlling and comparison processes. In other embodiments, the pixel statistic is an average gray value of all pixels of the image F. It is appreciated that the reference data of an image being stored is not limited to those described in the present disclosure as long as the image feature can be identified.

It should be noted that according to the design of the optical mechanism, the light emitting unit 101 and the light sensing unit 1020 may be arranged in various ways. For example, the two units may be arranged symmetrically to a normal line of a reflective surface such that the light sensing unit 1020 may receive the reflected light in an angle symmetrical to that of the light emitting unit 101 emitting light (e.g. referred as a bright field arrangement). Or the light sensing unit 1020 may be arranged above the detection surface 107 illuminated by the light emitting unit 101 so as to receive scattered light from the detection surface 107 (e.g. referred as a dark field arrangement). The optical encoder 10 may have a relative motion with respect to the detection surface 107. The detection surface 107 is adaptable to various fields such as the control knob including a volume control knob, a temperature control knob, a moisture control knob and various equipment knobs, or the linear control including the position control of a printer nozzle, the position control of an audio pickup head, the rearview mirror control and the chair back angle adjustment, but not limited thereto. These applications have the feature that an original position or multiple reference positions need to be precisely defined. In the optical encoder 10, predetermined frame processing results or predetermined shutter parameter ranges corresponding to the original position and every reference position are stored and used as the reference data associated with these positions.

Figure 7A:
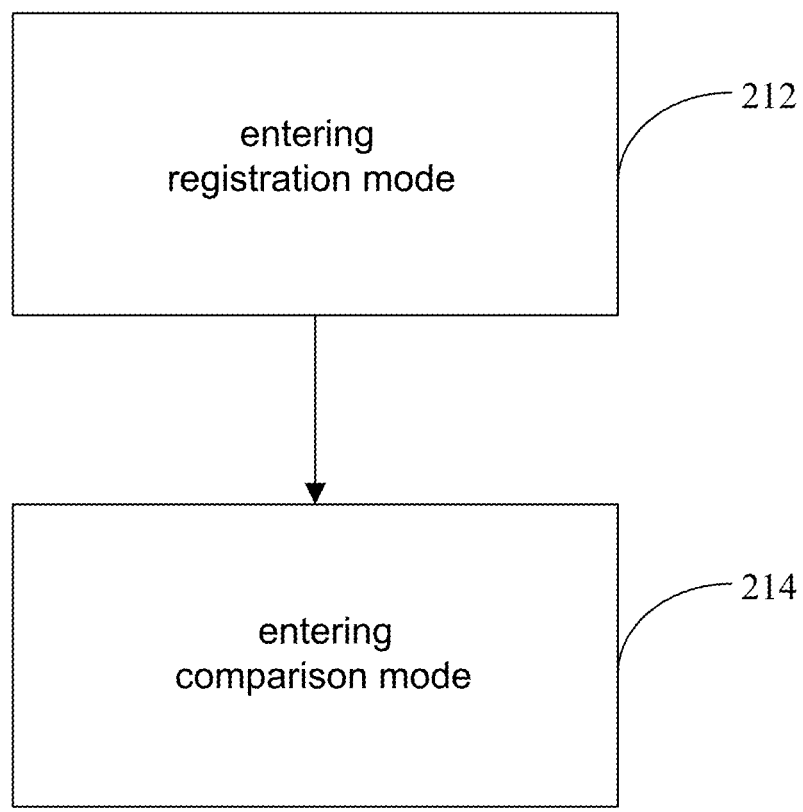
FIGS. 7a to 7e are flow charts of the present disclosure.

FIGS. 7a, 7b, 7c, 7d and 7e are flow charts of an operating method in applying the present invention. FIG. 7a shows that in applying the present invention, the optical encoder enters a registration mode 212 at first and then enters a comparison mode 214. In the registration mode 212, the optical encoder records at least one detected signal which is then frame identified to be served as the reference data or records at least one shutter parameter range to be served as the reference data. For example, the processing unit 1021 stores the reference data associated with at least one reference position on the detection surface 107 according to the detected signal or shutter parameter, wherein the reference data includes at least one predetermined image feature range or at least one predetermined shutter parameter range. In the comparison mode 214, the optical encoder compares a frame processing result or a current shutter parameter with the reference data so as to identify whether the optical encoder is at the position corresponding to the reference data, e.g. the original position or one of a plurality of reference positions mentioned above. For example, the processing unit 1021 generates comparison image data according to the detected signal, and compares the comparison image data (i.e. current image data) with the reference data (i.e. pre-stored image data) so as to determine a current position.

In an embodiment of using shutter parameters, the processing unit 1021 in the comparison mode 214 compares a current shutter parameter with the predetermined shutter parameter range to determine a current position, wherein the current shutter parameter is referred to a shutter parameter used by the light sensing unit 1020 for capturing a current image F. In this embodiment, the predetermined shutter parameter range is obtained, in the registration mode 212, by adding a predetermined value to and subtracting a predetermined value from the shutter parameter corresponding to the at least one reference position (e.g., referring to FIG. 13), wherein the predetermined value is determined according to the noise tolerance of system. The added predetermined value may be different from the subtracted predetermined value.

In an embodiment of using image features, the processing unit 1021 in the comparison mode 214 compares a current image feature with the predetermined image feature range to determine a current position, wherein the current image feature is referred to an image feature obtained from a current image F captured by the light sensing unit 1020 in the comparison mode 214. In this embodiment, the predetermined image feature range is obtained, in the registration mode 212, by adding a predetermined value to and subtracting a predetermined value from the image feature corresponding to the at least one reference position (e.g., referring to FIG. 12), wherein the predetermined value is determined according to the noise tolerance of system. Similarly, the added predetermined value may be different from the subtracted predetermined value.

The circular relative motion between the optical encoder 10 and the detection surface 107 is taken as an example herein, and the linear relative motion between the optical encoder 10 and the detection surface 107 is similar thereto, e.g. taking one end or the center of a linear region as an original position.

Figure 7B:
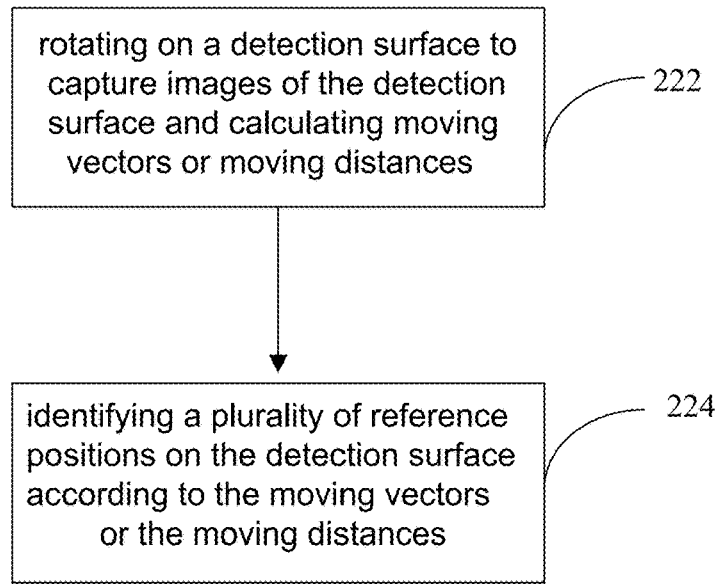

FIG. 7b further explains one embodiment of a registration mode, and the optical encoder 10 rotating on the detection surface 107 is taken as an example herein. In the registration mode, in the step 222 the optical encoder 10 rotates on the detection surface 107 to capture images of the detection surface 107 and calculates moving vectors or moving distances till a start position is returned. For example, the processing unit 1021 calculates difference values between the reference data associated with a start position and the reference data of the followed every image, and when the image having the smallest difference value appears again, it means that the start position is returned. A range between the start position being repeatedly detected is referred to an operation range. Then in the step 224, the optical encoder rotates continuously and identifies a plurality of reference positions (e.g. including the original position and at least one reference position) on the detection surface (e.g. the operation range) according to the moving vectors or moving distances, and detected signals associated with predetermined positions are recorded as reference data. For example, a plurality of positions may be equally identified on the detection surface 107 according to the moving vectors or moving distances within one circle rotation, and the detected signal is recorded when the optical encoder passes each of the positions to be served as the reference data associated with every reference position. Furthermore, in FIG. 7b an operation range is determined by repeatedly recognizing an identical start position, and then the operation range is equally or unequally divided using the moving vectors or moving distances.

The purpose of using the moving vectors or moving distances as the dividing reference is due to the non-uniform motion between the optical encoder 10 and the detection surface 107 in the process of constructing the reference data of the original position and multiple reference positions. In order to equally divide the operation range on the detection surface 107, the moving vectors or moving distances are served as the dividing reference. In another embodiment, when the relative motion between the optical encoder 10 and the detection surface 107 is a uniform motion (e.g. by electronic automatic control), the detection surface 107 may be divided equally or unequally according to a rotation time or a rotation angle for one circle rotation. In other words, FIG. 7b shows that an operation range is divided using a moving vector, a moving distance, a rotation angle or a rotation time, and the reference data corresponding to every reference position is stored. The registration mode may be executed before shipment of the optical encoder 10, by user's selection or when the update of the reference data is identified necessary by the system itself, so as to store the reference data corresponding to the original position and every reference position.

Figure 7C:
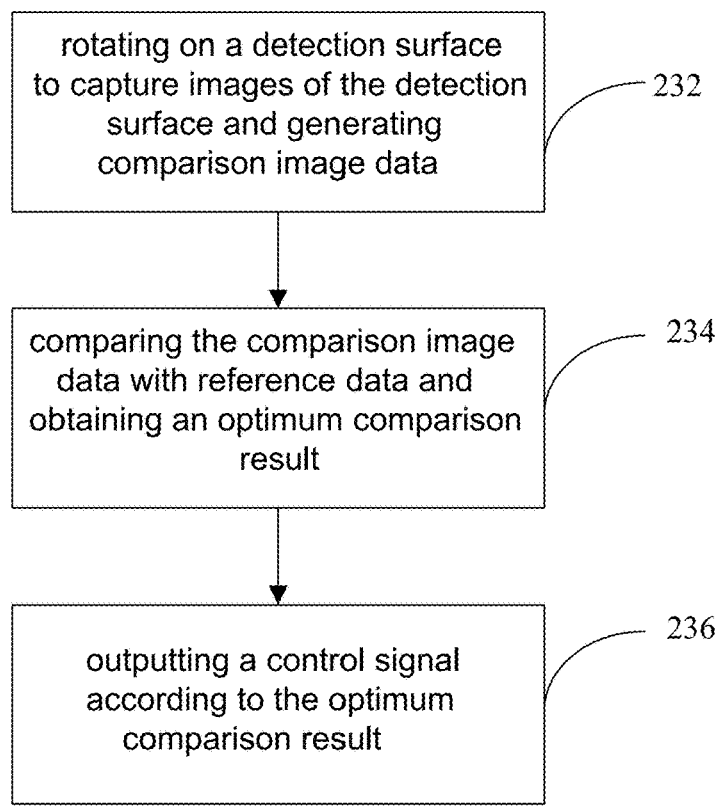

FIG. 7c further explains one embodiment of a comparison mode 214. Referring to steps of FIG. 7b together, in the step 224 of FIG. 7b, the optical encoder has generated the reference data of a plurality of positions (e.g. including the original position and reference positions). In the comparison mode, the optical encoder 10 rotates on the detection surface 107. In the step 232, the optical encoder 10 captures images of the detection surface 107 during rotation and accomplishes the frame processing, e.g. image filtering and digitizing, so as to obtain the comparison image data. It is appreciated that the process for generating the comparison image data is preferably identical to that for generating the reference data, e.g. calculating the gray value difference or average gray value of pixels as mentioned above for being compared in the following processes. Then in the step 234, the optical encoder 10 compares the comparison image data with the reference data and obtains an optimum comparison result. For example, the comparison result is compared with at least one threshold so as to obtain a digitized comparison result, the maximum comparison result exceeding the threshold or the minimum comparison result lower than the threshold is referred as the optimum comparison result to be associated with a current position. For example in one embodiment, the difference value between the comparison image data and a plurality of reference data is respectively calculated, and whether the difference value between the comparison image data and the reference data is smaller than a threshold is identified, wherein for example calculating a difference value between gray value differences or average gray values of the comparison image data and that of the reference data. Finally in the step 236, a current position of the optical encoder 10 corresponding to the reference data is identified according to the optimum comparison result, and the signal is outputted. In other embodiments, the comparison result may be generated through other ways. For example, the optical encoder may take a first accurate reference data in the comparing process as the optimum comparison result. Said threshold may be a predetermined threshold or dynamically adjusted with the system operation.

In another embodiment, in the Step 232 the optical encoder 10 determines the shutter parameter for acquiring current images in the rotating. Next in the Step 234, the optical encoder 10 compares the determined current shutter parameter with the stored reference data to obtain an optimum comparison result, e.g., the current shutter parameter within the predetermined shutter parameter range which is stored in the registration mode 212. Finally in the Step 236, it is able to identify a current position of the optical encoder 10 according to the optimum comparison result and output a control signal.

In an alternative embodiment, in the Step 232 the optical encoder 10 calculates the image feature of the acquired current images in the rotating. Next in the Step 234, the optical encoder 10 compares the calculated current image feature with the stored reference data to obtain an optimum comparison result, e.g., the current image feature within the predetermined image feature range which is stored in the registration mode 212. Finally in the Step 236, it is able to identify a current position of the optical encoder 10 according to the optimum comparison result and output a control signal.

Figure 7D:
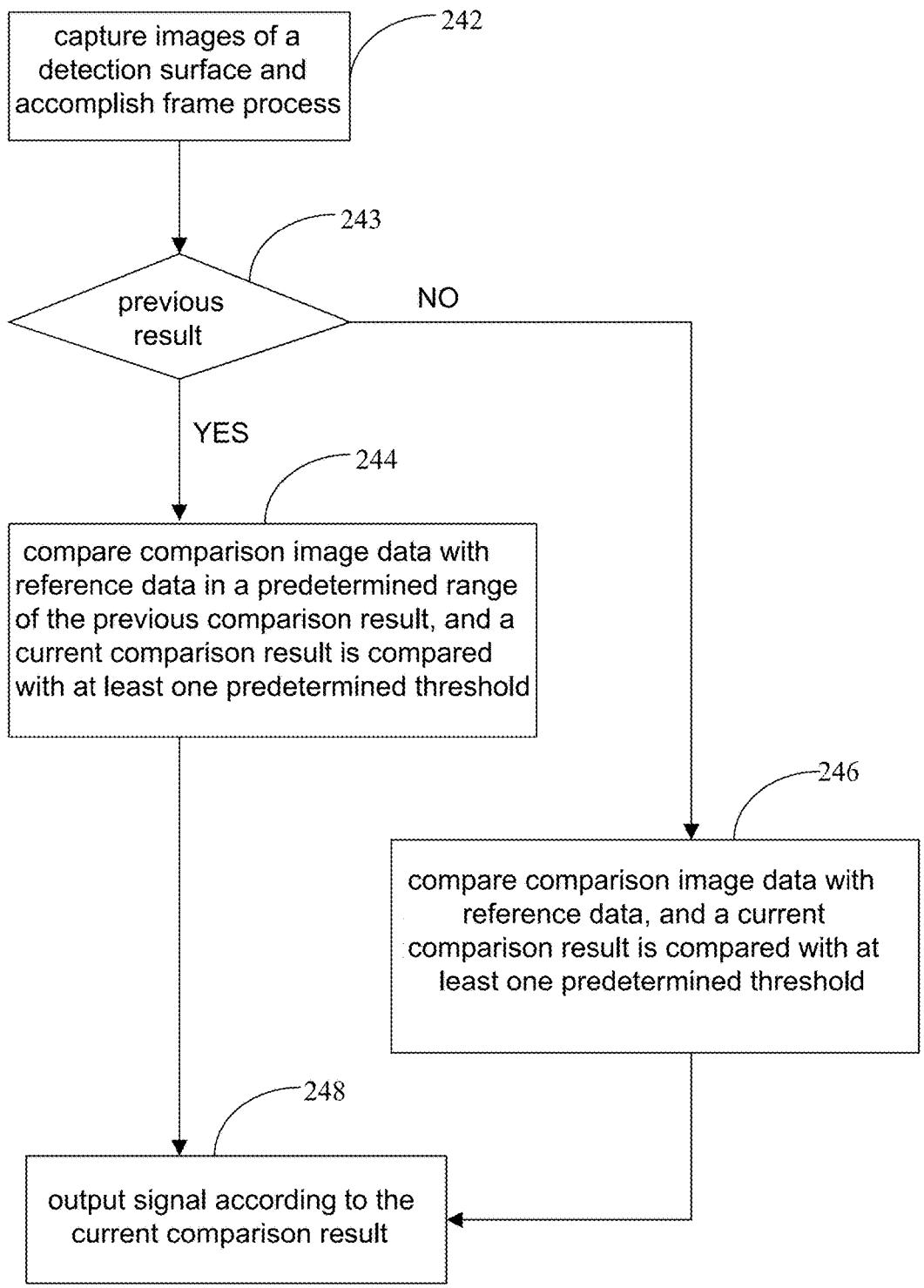

FIG. 7d further explains one embodiment of a comparison mode with reduced power. According to a previous comparison result, a range of the reference data to be compared is reduced so as to achieve the power saving. In the step 242, the optical encoder 10 captures images of the detection surface 107 and accomplishes the frame processing to generate the comparison image data. In the step 243, the optical encoder 10 firstly identifies whether a previous comparison result exists to be served as a basis in the following comparing process. If a previous comparison result exists, the reference data in a predetermined range is retrieved from a reference data range represented by the previous comparison result. And in the step 244, the comparison image data is compared with the reference data within the predetermined range of the previous comparison result, and a current comparison result is compared with at least one threshold. For example, if the previous comparison result is an angle, only a part of reference data within a predetermined angle range close to said angle is compared. This method may limit the compared range close to the previous comparison result such that the comparing process is not performed with all the reference data so as to reduce the calculating amount thereby saving the power and comparison time. Said predetermined range may be adjusted according to the system requirement. If it is necessary to obtain the current comparison result quickly, the predetermined range may be reduced, or vice versa. Then in the step 248, the signal is outputted according to the current comparison result. If the previous comparison result does not exist, then in the step 246 the comparison image data is compared with all the reference data and a current comparison result is then compared with at least one threshold so as to obtain an optimum comparison result, similar to the step 234 shown in FIG. 7c.

Figure 7E:
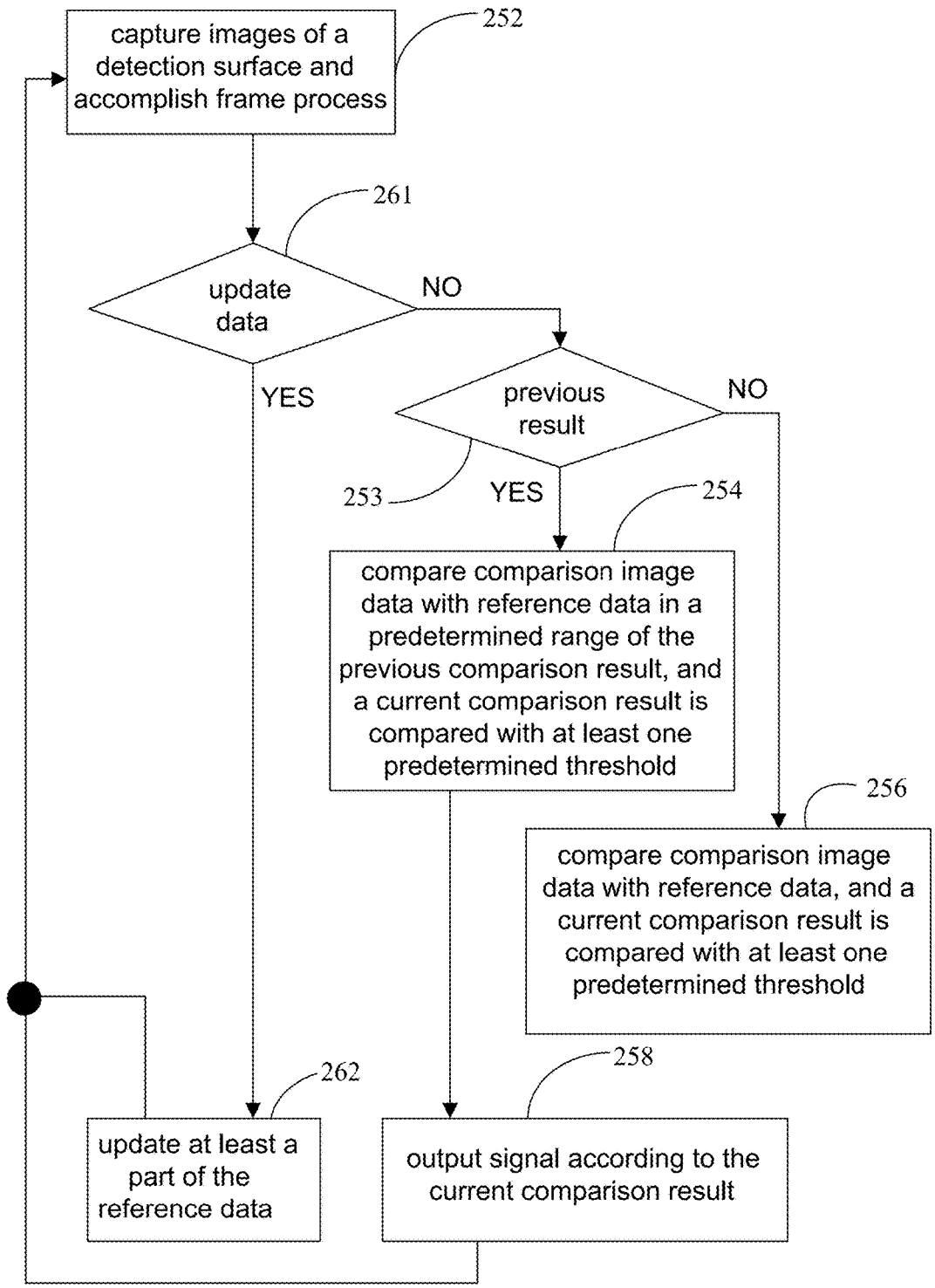

FIG. 7e further explains one embodiment of a comparison mode with contamination resistant and higher stability. According to the previous comparison result, it is able to determine whether to update at least a part of the reference data range so as to realize the contamination resistant and higher stability. After being used for some time, the hardware may be damaged and the detection surface 107 may be polluted to cause the interference to the image capturing of the optical encoder. It is able to realize the contamination resistant and higher stability by updating the reference data. When the contamination is formed on the detection surface 107, the contamination may be treated as a part of features of the detection surface 107 different from positions. When the contamination is formed on the optical encoder 10, a fixed interference is formed to influence every image. The above two interferences may be eliminated by updating the reference data range. In the step 252, the optical encoder 10 captures images of the detection surface 107 and accomplishes the frame processing so as to generate the comparison image data. In the step 261, the optical encoder 10 firstly identifies whether it is necessary to update the reference data (described below). If the reference data needs to be updated, then after at least a part of the reference data is updated in the step 262, the step 252 is then executed continuously. If the reference data needs not to be updated, then in the step 253 the optical encoder firstly identifies whether a previous comparison result exists to be served as a basis in the following comparing process. If a previous comparison result exists, the reference data in a predetermined range is retrieved from the reference data range represented by the previous comparison result. And in the step 244, the comparison image data is compared with the reference data within the predetermined range of the previous comparison result, and a current comparison result is compared with at least one threshold. Then in the step 258, a control signal is outputted according to the current comparison result and whether to update a part of the reference data is determined, and then the step 252 is executed continuously. If the previous comparison result does not exist, then in the step 246 the comparison image data is compared with all the reference data and a current comparison result is compared with at least one threshold so as to obtain an optimum comparison result, similar to the step 234 shown in FIG. 7c.

In one embodiment, when all the comparison results do not fulfill the condition limited by the threshold, e.g. the difference value between the comparison image data and the reference data is always larger than or smaller than a threshold, the current shutter parameter not falling in the predetermined shutter parameter range or the current image feature not falling in the predetermined image feature range, it means that the fixed noise in the captured images is high enough to influence the detection result such that this may be arranged as a condition for updating at least a part of the reference data, e.g., adjusting boundary values of the predetermined shutter parameter range or the predetermined image feature range.

In another embodiment, in the comparison mode 214, even though the current shutter parameter (or current image feature) is within the predetermined shutter parameter range (or predetermined image feature range), the current shutter parameter (or current image feature) corresponding to the at least one reference position is always equal to or very close to boundary values (e.g., 1400, 1600, 900, 1100 in FIG. 13) of the predetermined shutter parameter range (or the predetermined image feature range), it means that the predetermined shutter parameter range (or the predetermined image feature range) set before shipment is no longer suitable for the current operating condition or environment such that the processing unit 1021 automatically updates at least a part of the predetermined shutter parameter range (or the predetermined image feature range). For example, the registration mode 212 is executed to add a predetermined value to and subtract a predetermined value from the new shutter parameter (or image feature) corresponding to the at least one reference position to obtain the updated predetermined shutter parameter range (or the updated predetermined image feature range). The predetermined value is changeable during the updating.

Figure 8A:
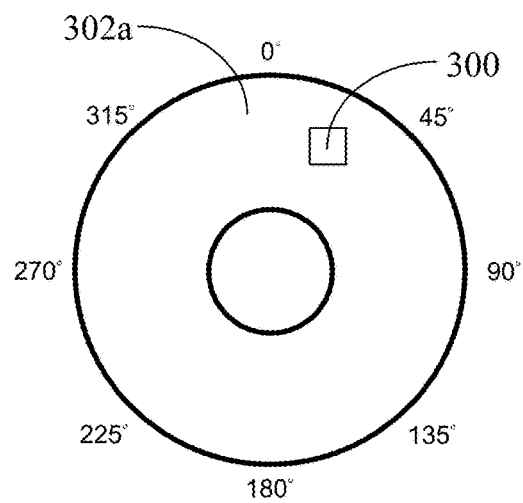
FIGS. 8a and 8b are upper views of a working surface respectively without any marker and a few markers to which the present invention applies.
Figure 8B:
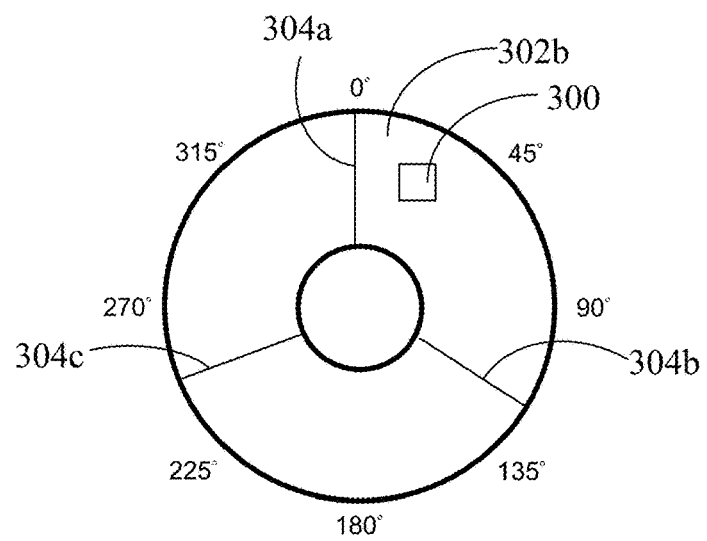

Referring to FIGS. 8a and 8b, wherein FIG. 8a is an upper view of the detection surface 302a without any marker to which the present disclosure applies, and FIG. 8b is an upper view of the detection surface 302a with markers to which the present disclosure applies. In FIG. 8a, the optical encoder is applied to a knob control, and the optical encoder 300 rotates with respect to the detection surface 302a, e.g. one of the optical encoder 300 and the detection surface 302a being combined with the rotating mechanism of a knob and the other one is kept steady. In this manner, when the knob is rotated, a relative rotation occurs between the two elements.

As shown in FIG. 8a, the optical encoder 300 directly detects surface features on the detection surface 302a and generates the frame identification result. Generally, the surface made of any kind of material has more or less rugged textures. Therefore, when the optical encoder 300 emits light to the detection surface 302a, reflected light from the detection surface 302a generates bright and dark patterns according to the features of the material surface. And these textures are different from position to position and generally do not repeatedly appear, and thus different textures can be detected at different positions of the detection surface 302a. It order to prevent errors due to similar patterns contained in the detected surface image, the examination and extraction processes may be performed in the registration mode. In the registration mode, when the optical encoder 300 is at the original position (e.g. indicated as 0 degree herein) or a specific position (e.g. indicated as 45 degrees, 90 degrees, 135 degrees, 180 degrees, 225 degrees, 270 degrees or 315 degrees herein) defined by the knob, the frame processing result is recorded to be served as a comparison reference value (i.e. the reference data mentioned above) for being compared when the optical encoder 300 passes the positions again. It is appreciated that said specific positions may be defined according to the moving vector, moving position, rotation time or rotation angle mentioned above.

The difference between FIG. 8b and FIG. 8a is that in FIG. 8b the detection surface 302b has simple markers, e.g. the marker 304a on the detection surface 302b indicating a specific position or angle of the knob such as an original position. In the registration mode, when the optical encoder 300 firstly detects reflected light from the marker 304a and generates a detected signal, the frame processing result is stored as reference data. Then in the comparison mode, each time when the optical encoder 300 passes the marker 304a, the light sensing unit 1020 thereof detects the reflected light from the marker 304a and generates a detected signal. The processing unit 1021 then generates the frame processing result according to the detected signal. As the frame processing result includes the feature of the marker 304a, the optical encoder 300 then outputs this frame processing result which is then compared with the reference data to identify whether the knob is rotated to the original position.

Similarly, the detection surface 302b may have a plurality of markers, e.g. 304b, 304c and so on, to indicate different positions or angles of the knob. In the comparison mode, when the optical encoder 300 passes these markers, frame processing results generated by the processing unit 1021 include features of each of the markers to identify a current position or angle of the knob accordingly.

These positions or angles may be applied to different controls, e.g. different positions indicating different volumes, different adjusting ranges and so on. It is appreciated that the number and the position of the reference positions in FIGS. 8a and 8b may be determined according to the required angle resolution and not limited to those described in the present disclosure.

Figure 12:
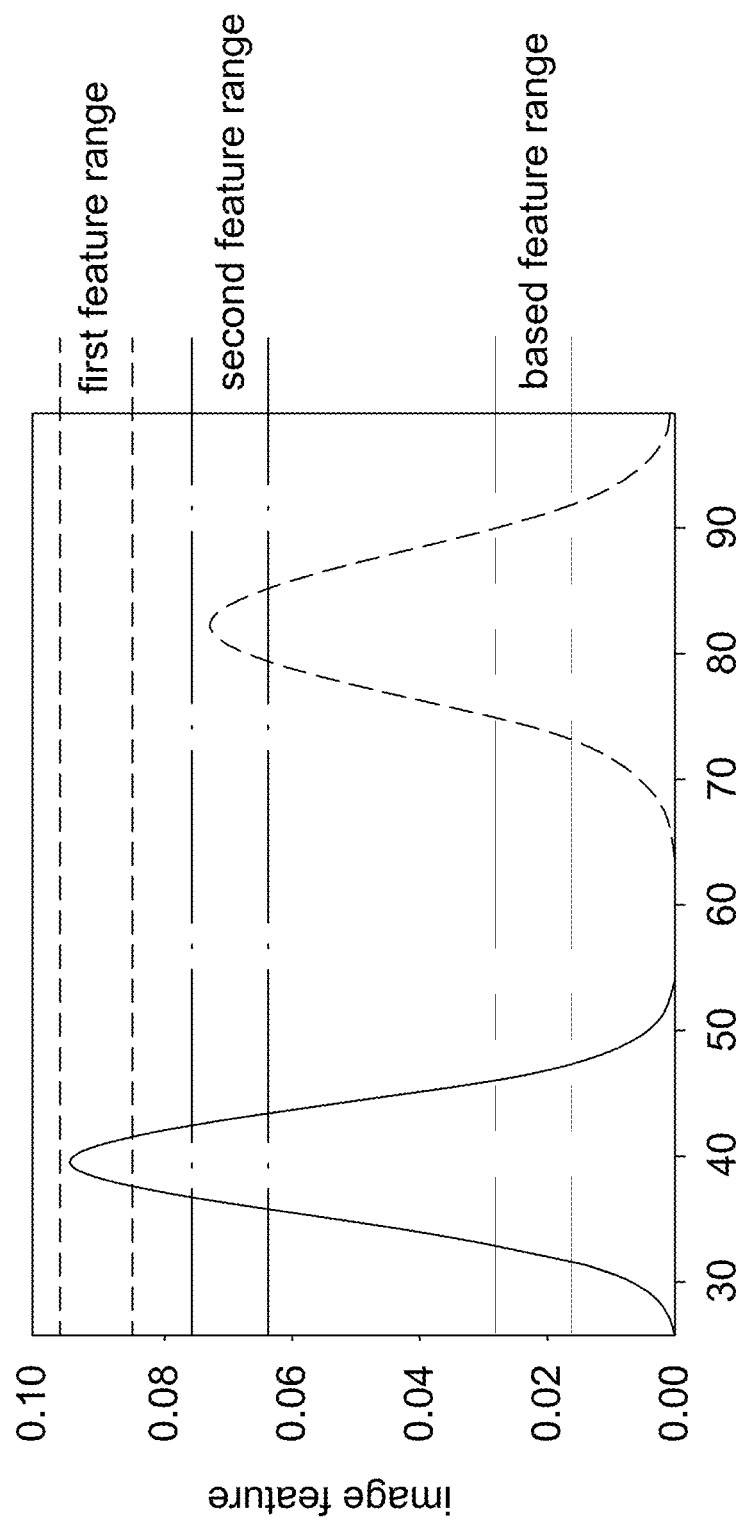
FIG. 12 is a schematic diagram of predetermined image feature ranges.

In another embodiment, the optical encoder 300 prestores image feature ranges, e.g., image quality range or pixel statistic range, corresponding to the above markers 304a, 304b, 304c (having different predetermined blackness) in the registration mode 212. For example referring to FIG. 12, in the registration mode 212 the processing unit 1021 determines a predetermined image feature range according to frame processing results respectively corresponding to features of each markers 304a, 304b, 304c, e.g., first marker 304a corresponding to a first feature range, a second marker 304b corresponding to a second feature range and so on, and positions other than the markers corresponding to a based feature range. In the comparison mode 214, when the processing unit 1021 obtains, according to the frame processing results, an image feature of a current image within the predetermined image feature range, it means that the optical encoder 300 passes or is right above a specific marker such that an absolute position of the optical encoder 300 is determined. It should be mentioned that although FIG. 12 shows that the first and second feature ranges are higher than the based feature range, it is not to limit the present disclosure. In other embodiments, the first and second feature ranges are lower than the based feature range as long as the image features corresponding to the markers are distinguishable from other positions without markers.

In other embodiments, if the optical sensing unit 1020 adopts the auto exposure mechanism and when the optical sensing unit 1020 passes the markers having different predetermined blackness, the shutter parameter of the optical sensing unit 1020 changes correspondingly. For example referring to FIG. 13, in the registration mode 212, the processing unit 1021 sets a predetermined shutter parameter range corresponding to each marker, e.g., the marker 304a corresponding to a first shutter parameter range (e.g., 900-1100), the marker 304b corresponding to a second shutter parameter range (e.g., 1400-1600), and positions other than the markers corresponding to a based shutter parameter range (e.g., 300-500). In the comparison mode 214, when the processing unit 1021 obtains a shutter parameter for capturing a current image within the predetermined shutter parameter range, it means that the optical encoder 300 passes or is right above a specific marker such that an absolute position of the optical encoder 300 is determined. For example, when the processing unit 1021 determines a current shutter parameter within 900-1100, it means that the optical encoder 300 is aligned to the Marker 1; when the processing unit 1021 determines a current shutter parameter within 1400-1600, it means that the optical encoder 300 is aligned to the Marker 2; and so on.

Figure 13:
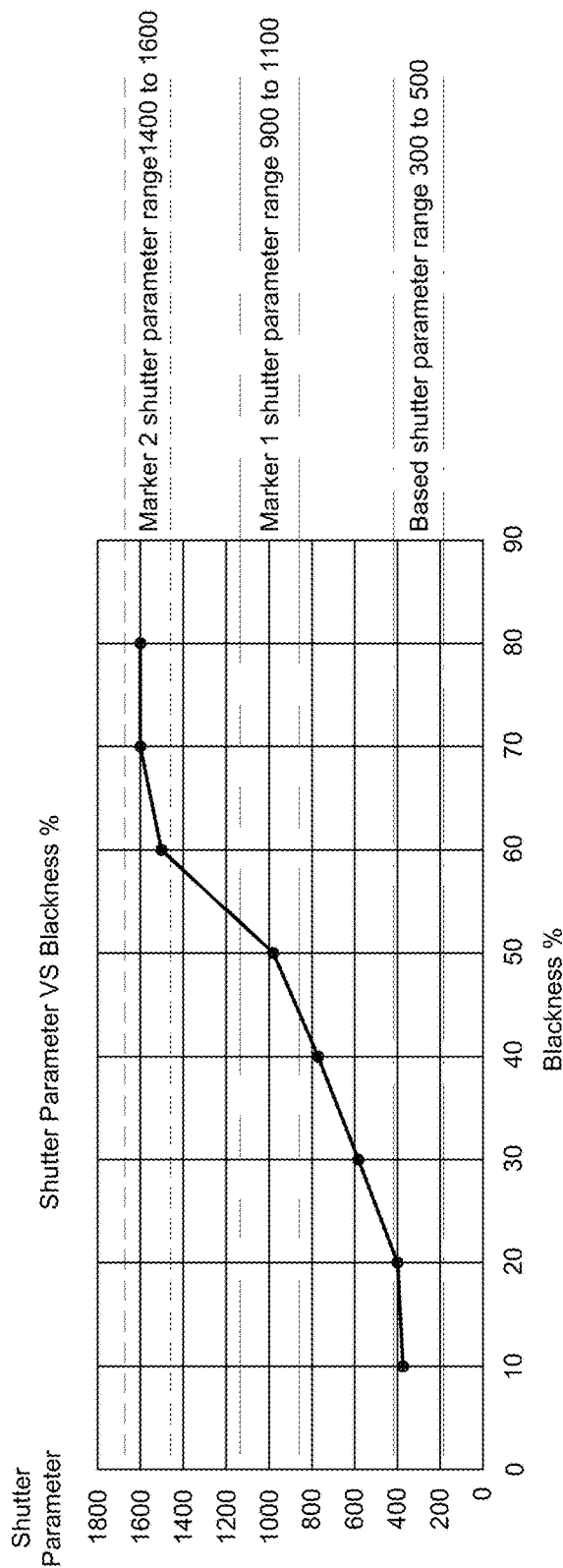
FIG. 13 is a schematic diagram of predetermined shutter parameter ranges.

Similarly, in FIG. 13 it is possible to set the shutter parameter ranges corresponding to the markers to be lower than the shutter parameter ranges at other positions without the markers.

Figure 14:
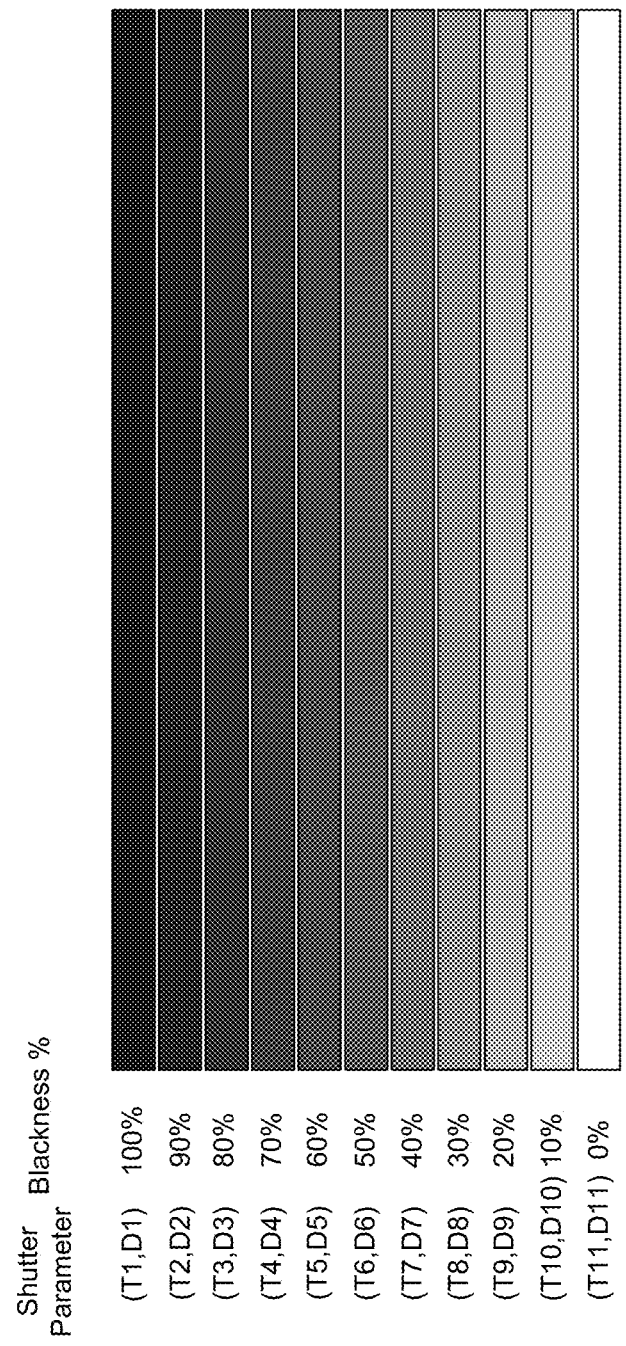
FIG. 14 is a schematic diagram of shutter parameters versus blackness.

Different markers are arranged with different predetermined blackness such that the processing unit 1021 is able to obtain different comparison results according to the frame processing results or shutter parameters. For example referring to FIG. 14, in an embodiment of using the shutter parameter, each blackness is corresponded to one shutter parameter, e.g., shutter speed T1-T11 and/or diaphragm D1-D11, wherein a number of markers used in an optical encoder 300 is determined according to the resolution of the light sensing unit 1020 and the size of the detection surface 302b. Accordingly, in the registration mode 212, the processing unit 212 stores a plurality of predetermined shutter parameter ranges corresponding to a plurality of reference positions 304a, 304b and 304c on the detection surface 302b, and each of the reference positions 304a, 304b and 304c is disposed with a marker having predetermined blackness different from each other as shown in FIG. 14. In the comparison mode 214, the processing unit 1021 is able to identify an absolute position of the optical encoder 300 according to a current shutter parameter within any of the predetermined shutter parameter ranges.

The embodiment of using the image quality or pixel statistics is similar. For example in the registration mode 212, the processing unit 212 stores a plurality of predetermined image feature ranges corresponding to a plurality of reference positions 304a, 304b and 304c on the detection surface 302b, and each of the reference positions 304a, 304b and 304c is disposed with a marker having predetermined blackness different from each other, i.e., the shutter parameter in FIG. 14 being replaced by the image feature. In the comparison mode 214, the processing unit 1021 only needs to identify whether a current image feature falls in any of the predetermined image feature ranges.

Comparing with using the image feature as an identification condition, using the shutter parameter does not need to compare two acquired images.

It is possible to manufacture the markers 304a, 304b and 304c by a printer. For example, it is possible to define a printed marker with the output setting (R,G,B)=(0,0,0) of the printer as 100% blackness, define a printed marker with the output setting (R,G,B)=(25,25,25) of the printer as 90% blackness, . . . , and define a printed marker with the output setting (R,G,B)=(255,255,255) of the printer as 0% blackness. It is appreciated that the above RGB values are defined by the user without particular limitations. Accordingly, corresponding to different predetermined blackness, it is possible to obtain different image features and/or shutter parameters. The manufacturing of the markers 304a, 304b and 304c is not limited to that given herein as long as different markers are made with different light reflectivity.

Figure 9:
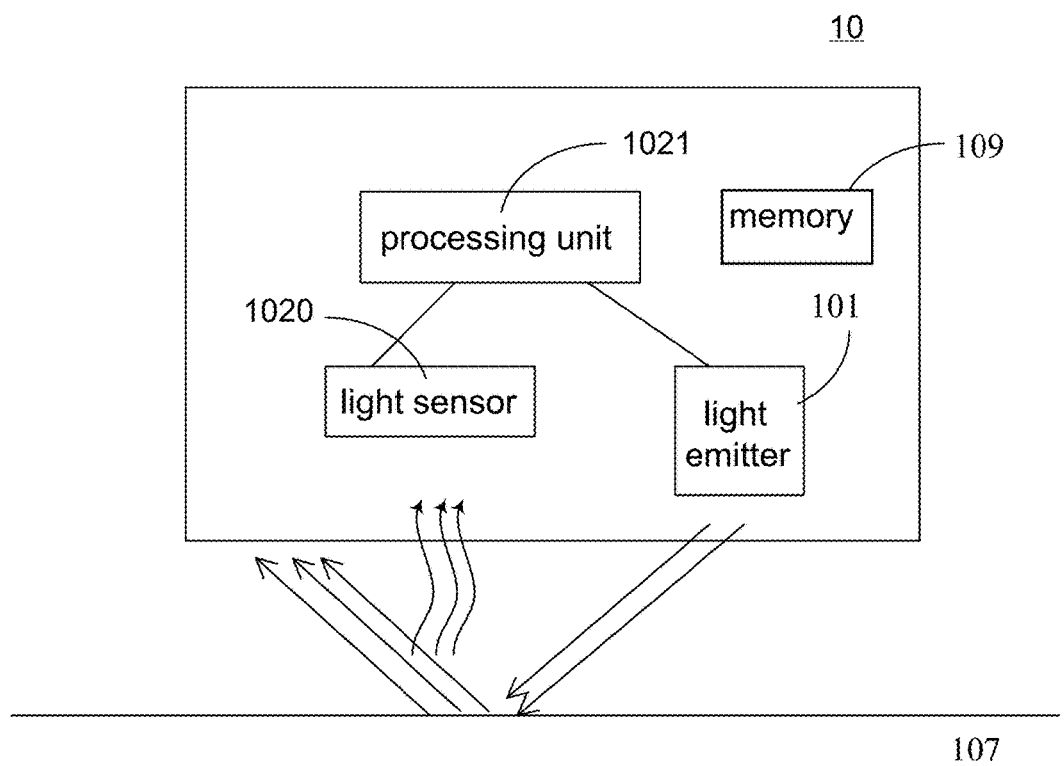
FIG. 9 is another embodiment of the present disclosure.

FIG. 9 is another embodiment of the present disclosure, which is different from the embodiment of FIG. 6 in that a memory unit 109 is further included in this embodiment. The memory unit 109 is configured to record at least one frame processing result or shutter parameter information (i.e. reference data) to be served as the basis for the following encoding process.

Figure 10:
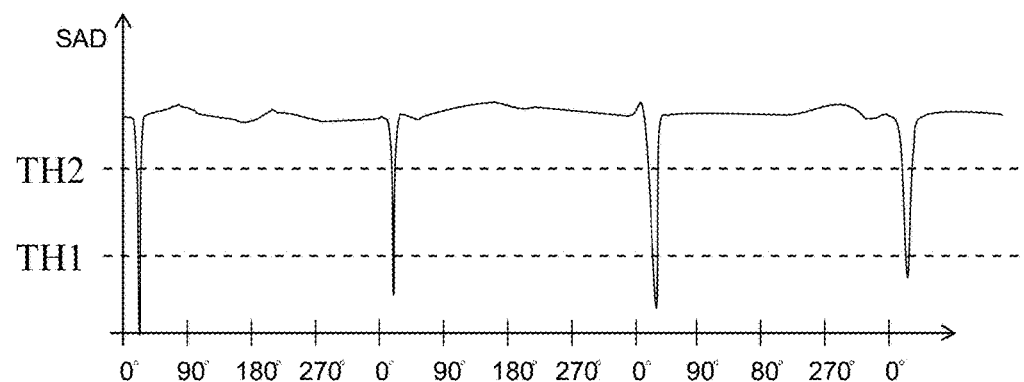
FIG. 10 is a schematic diagram of outputted signals when the present invention is applied to a working surface without any marker.

FIG. 10 is a schematic diagram of the signal comparison result when the present invention is applied to a detection surface (e.g. 302a) without any marker. Referring to FIG. 8a together, the transverse axis of FIG. 10 indicates rotation angles of a knob and the longitudinal axis indicates the frame identification result generated by the optical encoder 300, and this result may be represented by various numerical values, e.g. a sum of absolute difference (SAD) between the comparison image data and the reference data. When the sum of absolute difference is larger, it means that the current frame identification result detected by the optical encoder 300 has a larger difference from the comparison reference value, i.e. the optical encoder 300 is not at the specific position to be identified. In the example shown in FIG. 10, it is assumed that an angle of 20 degrees is the specific position to be aligned by the optical encoder 300. The optical encoder 300 captures a frame (image) when the knob is rotated at the position indicating 20 degrees on the detection surface, and the frame identification result is recorded as a comparison reference value, i.e. performing the registration mode. Then in the followed comparison mode, when the optical encoder 300 passes the position of 20 degrees again, the sum of absolute difference along the longitudinal axis significantly decreases. It means that the current frame identification result detected by the optical encoder 300 almost has no difference from the comparison reference value, i.e. the optical encoder 300 being aligned to the position of 20 degrees. The similar method may be adapted to the application having a plurality of comparison reference values. In one embodiment, the sum of absolute difference may be compared with an identification threshold TH1, and when the sum of absolute difference is smaller than the identification threshold TH1, it is able to identify that the rotation angle is at 20 degrees. In addition, in this embodiment the optical encoder 300 does not store the reference data corresponding to other angles. At other angles, as the sums of absolute difference are larger than the identification threshold TH1, the optical encoder 300 may define the angles at which the sum of absolute difference between the comparison image data and the reference data exceeds the threshold TH1 as unidentified angles or positions. And no control signal is generated corresponding to the unidentified angles or positions.

In addition, as mentioned above when the sums of absolute difference detected by the optical detector 300 corresponding to all angles are larger than the identification threshold TH1, i.e. the sum of absolute difference between the comparison image data at the current position and the reference data also exceeding the identification threshold TH1, it means that a part of the reference data (e.g. shown in FIG. 7e) may need to be updated. Then the optical encoder 300 may update the stored reference data. In another embodiment, when the fixed noise increases, the sum of absolute difference corresponding to most angles may decrease, and thus the update condition may be set as when the sums of absolute difference corresponding to a part of angles are smaller than an update threshold TH2, i.e. the sums of absolute difference between a part of the comparison image data (not at the current position) with the reference data are smaller than the update threshold TH2, the optical encoder 300 may update at least a part of the reference data being stored, wherein the number of angles or positions at which the sum of absolute difference is smaller than the update threshold TH2 may be determined according to the system tolerance.

In addition, when the optical encoder 300 is rotated by a fixed angle step, an error accumulation may occur when continuously operating in a same rotating direction. For example, FIG. 10 shows that the sum of absolute difference at the angle of 20 degrees gradually increases during continuous operation, and thus in the comparison mode the processing unit 1021 may further calculate a position difference between the comparison image data and the reference data to accordingly correct an accumulated error. For example, it is able to calculate a position difference between the optimum comparison image (e.g. at 20 degrees) and the reference data, and record an accumulated position difference of the position difference during continuous operation. When the accumulated position difference exceeds the fixed angle step, the optical encoder may be corrected by one angle step.

Figure 11:
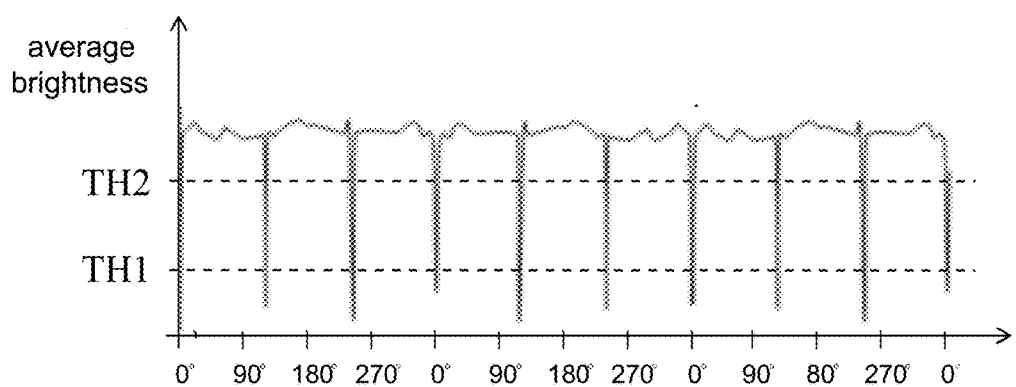
FIG. 11 is a schematic diagram of outputted signals when the present invention is applied to a working surface with markers.

FIG. 11 is a schematic diagram of the signal comparison result when the present invention is applied to a detection surface (e.g. 302b) with the marker(s). Referring to FIG. 8b together, the transverse axis of FIG. 11 indicates rotation angles of a knob and the longitudinal axis indicates the frame processing result generated by the optical encoder 300. In applying to the detection surface with the marker (e.g. 302b), the frame processing result may be represented by various parameter value, e.g. image features such as average brightness value or image quality. Corresponding to the material characteristic of the marker, the marker may be arranged to have a specific reflective brightness. When the image features is smaller or larger (e.g. smaller shown in FIG. 11), it means that a current frame detected by the optical encoder 300 is identified to have the marker, i.e. the optical encoder 300 is at the specific position to be identified. Similarly, an identification threshold TH1 and/or an update threshold TH2 may be set previously in FIG. 11 as the basis for identifying positions (angles) or updating reference data.

In an embodiment that the longitudinal axis in FIG. 10 indicates the image feature or shutter parameter, when the optical encoder 300 moves to a specific position to be identified, the amplitude also has a significant change, e.g., from outside of a predetermined range to entering the predetermined range. Similarly, the optical encoder 300 identifies a position corresponding to the current shutter parameter not within the predetermined shutter parameter range or a position corresponding to the current image feature not within the predetermined image feature range as an unidentified angle or position. No control signal is generated corresponding to the unidentified angles or positions. The processing unit 1021 outputs a control signal only when the optical encoder 300 moves to opposite to the reference positions.

In applying the present invention, the optical encoder may further include a memory unit configured to store the frame data and/or frame processing result and relative information associated with every specific position. For example in the registration mode 212, the optical encoder 300 captures a frame (image) or determine a shutter parameter when the knob is rotated at the position indicating each specific position on the detection surface (e.g., 302b), and records the frame processing result or shutter parameter as a comparison reference value. When the identification is made according to the image difference, the difference along the longitudinal axis significantly decreases when the optical encoder 300 passes each specific position again. It means that the current frame processing result detected by the optical encoder 300 almost has no difference from the comparison reference value, i.e. the optical encoder 300 being aligned to each specific position. When the identification is made according to the predetermined range (e.g., predetermined shutter parameter range or predetermined image feature range), the knob is rotated at each specific position when the image quality, the pixel statistics or shutter parameter is within the predetermined range. That is, the optical encoder 300 compares an image quality, pixel statistics and/or shutter parameter of a current image with the predetermined range. When the current image quality, pixel statistics and/or shutter is within a specific predetermined range, an absolute position is then determined according to the specific predetermined range within which the current image quality, pixel statistics and/or shutter is.

Figure 15:
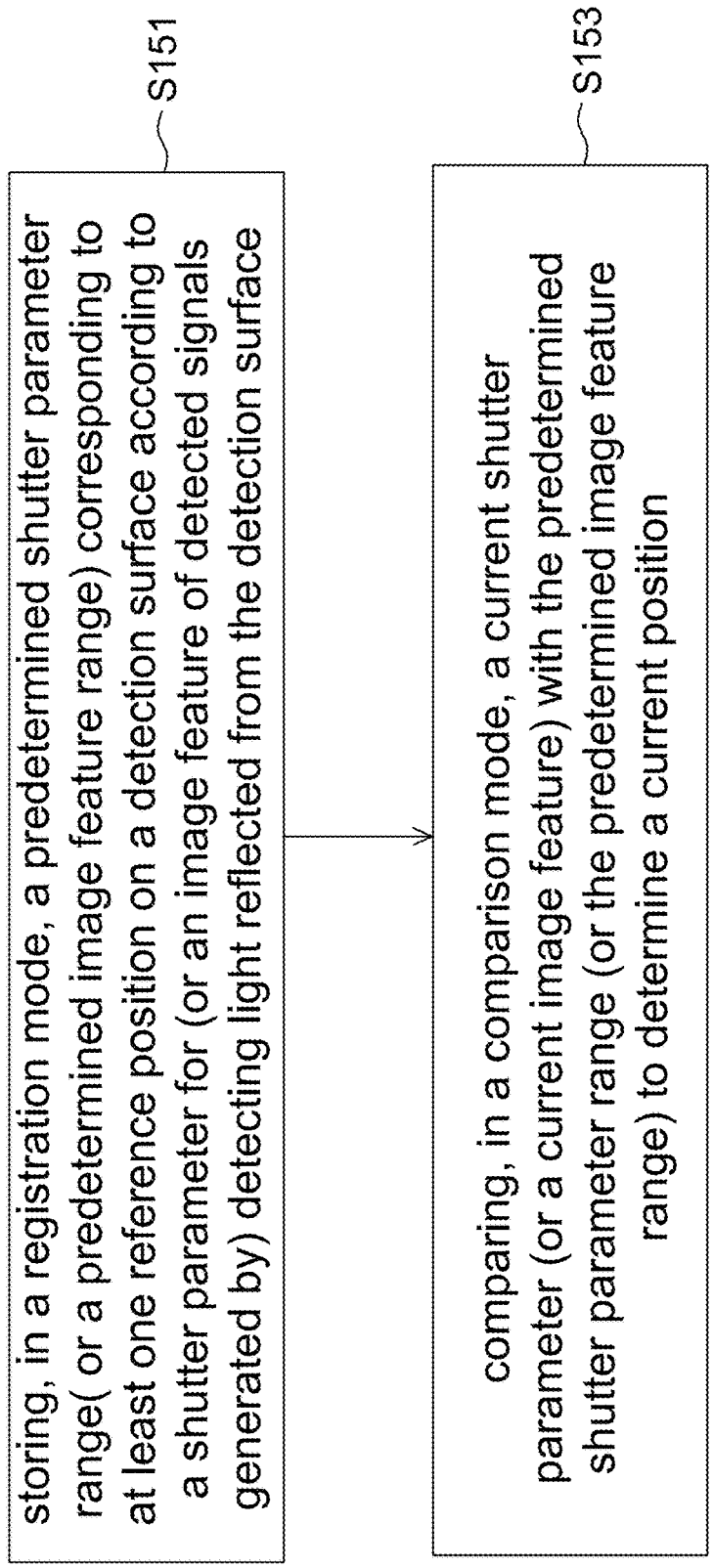
FIG. 15 is a flow chart of an operating method of an optical encoder according to one embodiment of the present disclosure.

Referring to FIG. 15, it is an operating method of an optical encoder according to one embodiment of the present disclosure, which includes the steps of: storing, in a registration mode, a predetermined shutter parameter range(or a predetermined image feature range) corresponding to at least one reference position on a detection surface according to a shutter parameter for (or an image feature of detected signals generated by) detecting light reflected from the detection surface (Step S151); and comparing, in a comparison mode, a current shutter parameter (or a current image feature) with the predetermined shutter parameter range (or the predetermined image feature range) to determine a current position (Step S153), wherein the registration mode is accomplished before shipment, determined by the system itself and/or by a user. For example, before shipment the optical encoder of the this embodiment is integrated with at least one predetermined shutter parameter range or at least one image feature range depending on the algorithm being adopted.

Step S151: This step is performed as the registration mode 212. As shown in FIG. 12, the predetermined image feature range is obtained by adding a predetermined value to or subtracting a predetermined value from the image feature, obtained in the registration mode 212, corresponding to at least one reference position. As show in FIG. 13, the predetermined shutter parameter range is obtained by adding a predetermined value to or subtracting a predetermined value from a shutter parameter, obtained in the registration mode 212, corresponding to at least one reference position. As mentioned above, when the detection surface is arranged with a plurality of reference positions, each of the reference positions is disposed with a marker having predetermined blackness different from each other. Each marker corresponds to one predetermined shutter parameter range.

Step S153: This step is performed as the comparison mode 214. In the comparison mode 214, the processing unit 1021 only needs to compare the current image feature with pre-stored image feature range or compare the current shutter parameter with pre-stored parameter range to directly obtain a current absolute position of the optical encoder.

In addition, in the comparison mode 214, the processing unit 1021 further calculates, e.g., by comparing two images F such as calculating the correlation, relative displacement according to detected signals detected by the light sensing unit 1020. As mentioned above, an error accumulation may occur when the optical encoder is continuously operated in a same rotating direction.

Accordingly, when the processing unit 1021 detects that a current shutter parameter is within the predetermined shutter parameter range or a current image feature is within the predetermined image feature range, the relative displacement is set to zero. As the predetermined shutter parameter range and the predetermined image feature range are used to decide absolute positions of the optical encoder, the error accumulation is avoided by setting the relative displacement to zero.

In addition, the optical encoder may further include a wired or wireless communication interface configured to communicate the relative information with other hardware, e.g. activated by receiving a control signal from the host or sending the comparison result to other hardware. For example, the reference data may be stored in the optical encoder or in an external host. When the reference data is stored in the optical encoder, the optical encoder directly identifies the position or angle and outputs a control signal to the controlled device or a host. When the reference data is stored in an external host of the optical encoder, the optical encoder may output the encoded data (i.e. the comparison image data) to the host to allow the host to perform the identification of the position or angle.

In order to apply the present invention to the embodiment that has a faster speed of relative motion with respect to the detection surface, preferably the frame rate of the present invention is higher than 1,000 frames per second. Meanwhile, according to different material of the detection surface, it is able to set different emitting power or emitting frequencies, or adaptively adjust the emitting power or emitting frequency according to the brightness or dark parameter detected by the light sensing unit.

In applying the present invention, the light sensing unit may include a light sensing array composed of a plurality of sensing pixels, e.g. a square light sensing matrix composed of 30×30 pixels or a rectangular light sensing matrix having different side lengths. The actual size of the light sensing array is determined according to the pixel number and pixel size, and is adjustable according to the resolution required by the system.

In other embodiments, the optical sensing matrix may activate or deactivate a part of sensing pixels according to the system requirement. For example, in a light sensing matrix composed of 36×36 pixels, it is able to activate all sensing pixels or activate only a part of sensing pixels, e.g. a sub-matrix of 18×18 pixels is activated, or to activate sensing pixels separated by one deactivated sensing pixel. In this manner, although the detectable range or the sensing resolution of the light sensing matrix is decreased, power consumption is reduced.

It should be mentioned that although a reflective optical encoder is taken as an example in the above embodiments, i.e. the light emitting unit and the light sensing unit arranged at the same side of the detection surface, a transmissive optical encoder is possible when the detection surface is made of light transparent or translucent material, i.e. the light emitting unit and the light sensing unit arranged at different sides of the detection surface. In addition to the disposed positions of the light emitting unit and the light sensing unit are different, the operating method is similar to the above embodiments and thus details thereof are not described herein.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical encoder comprising:
   a light emitting unit configured to emit light to a detection surface;
   a light sensing unit configured to detect reflected light from the detection surface using a shutter parameter to generate detected signals; and
   a processing unit configured to
   store, in a registration mode, at least one predetermined shutter parameter range corresponding to at least one reference position on the detection surface according to the shutter parameter, and
   determine, in a comparison mode, a current position by comparing a current shutter parameter with the predetermined shutter parameter range.

2. The optical encoder as claimed in claim 1, wherein in the registration mode the processing unit is further configured to
   calculate a relative displacement according to the detected signals, and
   set the relative displacement to zero when the current shutter parameter is within the predetermined shutter parameter range.

3. The optical encoder as claimed in claim 1, wherein the processing unit is configured to store a plurality of predetermined shutter parameter ranges corresponding to a plurality of reference positions on the detection surface, and each of the reference positions is disposed with a marker having predetermined blackness different from each other.

4. The optical encoder as claimed in claim 1, wherein in the comparison mode the processing unit is further configured to update the predetermined shutter parameter range when the current shutter parameter corresponding to the at least one reference position is equal to boundary values of the predetermined shutter parameter range.

5. The optical encoder as claimed in claim 1, wherein the predetermined shutter parameter range is obtained by adding a predetermined value to or subtracting the predetermined value from the shutter parameter corresponding to the at least one reference position.

6. The optical encoder as claimed in claim 1, wherein in the comparison mode the processing unit is further configured to identify a position corresponding to the current shutter parameter not within the predetermined shutter parameter range as an unidentified position.

7. The optical encoder as claimed in claim 1, wherein the shutter parameter comprises at least one of a shutter speed and a diaphragm.

8. An optical encoder comprising:
a light emitting unit configured to emit light to a detection surface;
a light sensing unit configured to detect reflected light from the detection surface to generate detected signals; and
a processing unit configured to
store, in a registration mode, at least one predetermined image feature range corresponding to at least one reference position on the detection surface according to the detected signals, and
determine, in a comparison mode, a current position by comparing a current image feature with the predetermined image feature range.

9. The optical encoder as claimed in claim 8, wherein in the registration mode the processing unit is further configured to
calculate a relative displacement according to the detected signals, and
set the relative displacement to zero when the current image feature is within the predetermined image feature range.

10. The optical encoder as claimed in claim 8, wherein image feature is an image quality value or a pixel statistic value.

11. The optical encoder as claimed in claim 8, wherein the processing unit is configured to store a plurality of predetermined image feature ranges corresponding to a plurality of reference positions on the detection surface, and each of the reference positions is disposed with a marker having predetermined blackness different from each other.

12. The optical encoder as claimed in claim 8, wherein in the comparison mode the processing unit is further configured to update the predetermined image feature range when the current image feature corresponding to the at least one reference position is equal to boundary values of the predetermined image feature range.

13. The optical encoder as claimed in claim 8, wherein the predetermined image feature range is obtained by adding a predetermined value to or subtracting the predetermined value from the image feature corresponding to the at least one reference position.

14. The optical encoder as claimed in claim 8, wherein in the comparison mode the processing unit is further configured to identify a position corresponding to the current image feature not within the predetermined image feature range as an unidentified position.

15. An operating method of an optical encoder comprising:
storing, in a registration mode, at least one predetermined shutter parameter range corresponding to at least one reference position on a detection surface according to a shutter parameter of a light sensing unit for detecting light reflected from the detection surface; and
comparing, in a comparison mode, a current shutter parameter with the predetermined shutter parameter range to determine a current position.

16. The operating method as claimed in claim 15, wherein the detection surface is disposed with a plurality of markers each corresponding to one of a plurality of reference positions, and each of the markers has predetermined blackness different from each other.

17. The operating method as claimed in claim 15, wherein in the comparison mode the operating method further comprises:
updating the predetermined shutter parameter range when the current shutter parameter corresponding to the at least one reference position is equal to boundary values of the predetermined shutter parameter range.

18. The operating method as claimed in claim 15, further comprising:
identifying a position corresponding to the current shutter parameter not within the predetermined shutter parameter range as an unidentified position.

19. The operating method as claimed in claim 15, wherein the shutter parameter comprises at least one of a shutter speed and a diaphragm.

20. The operating method as claimed in claim 15, further comprising:
calculating a relative displacement according to detected signals detected by the light sensing unit, and
setting the relative displacement to zero when the current shutter parameter is within the predetermined shutter parameter range.

\* \* \* \* \*